(12) United States Patent
Goldman

(10) Patent No.: US 6,650,627 B1
(45) Date of Patent: Nov. 18, 2003

(54) TONE DETECTION IN COMMUNICATION NETWORKS

(75) Inventor: Peter David Goldman, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/465,863

(22) Filed: Dec. 16, 1999

(51) Int. Cl.[7] ................................................. H04B 3/20
(52) U.S. Cl. ....................... 370/289; 370/290; 370/292; 375/231; 375/232; 375/233; 379/416; 379/406.05; 379/406.06; 379/406.08; 379/406.1
(58) Field of Search ................................ 370/286, 289, 370/290, 291, 292, 252, 465; 375/229, 231, 232, 233; 379/416, 417, 406.01, 406.05, 406.06, 406.08, 406.1

(56) References Cited

U.S. PATENT DOCUMENTS

| | | | | |
|---|---|---|---|---|
| 5,920,834 A | * | 7/1999 | Sih et al. | 704/233 |
| 6,044,068 A | * | 3/2000 | El Malki | 370/286 |
| 6,088,365 A | * | 7/2000 | Kurdzo et al. | 370/466 |
| 6,240,133 B1 | * | 5/2001 | Sommer et al. | 375/232 |
| 6,434,233 B1 | * | 8/2002 | Bjarnason et al. | 379/406.01 |
| 6,466,666 B1 | * | 10/2002 | Eriksson | 379/406.01 |

* cited by examiner

Primary Examiner—Dang Ton
Assistant Examiner—Shick Hom
(74) Attorney, Agent, or Firm—Patton Boggs LLP

(57) ABSTRACT

A communication circuitry for providing effective detection of tones in a communication network. The communication circuitry comprises filtration circuitry, summation circuitry, detection circuitry, and interface circuitry. The filtration circuitry is coupled to the summation circuitry and is configured to receive a communication, process the communication to estimate an echo return in the communication, and provide the estimated echo return to the summation circuitry. The summation circuitry is coupled to the detection circuitry and configured to receive the estimated echo return from the filtration circuitry, receive a tone transmission and echo return from the interface circuitry, subtract the estimated echo return from the tone transmission to generate a substantially pure tone, and provide the substantially pure tone to the detection circuitry. The detection circuitry is configured to receive the substantially pure tone and process the substantially pure tone to perform a programmed operation. The interface circuitry is coupled to the filtration circuitry and the summation circuitry and is configured to receive the communication, receive the tone transmission and provide the communication to the filtration circuitry and provide the tone transmission to the summation circuitry.

10 Claims, 5 Drawing Sheets

TONE DETECTION IN COMMUNICATION NETWORKS

FIELD OF THE INVENTION

The invention relates to communication networks and in particular, to tone detection in communication networks.

PROBLEM

In a communication network, a switching system performs the necessary switching to connect a call between two callers. One example of a switching system is a PBX. Switching systems eliminate the requirement to wire call devices directly to a central office or other communication network. Rather, the call devices such as telephones, computers, facsimile machines, and modems have individual connections to the switching system, which in turn provides access to the central office or other network over one or more high-speed communication paths.

Tones are utilized in communication networks to indicate specific events to communication devices. The communication device responds to the transmission of the tone to perform a programmed operation. For example, in a switching system a disconnect tone is transmitted from the network or central office when a remote caller goes on-hook. The disconnect tone indicates to the switching system that the connection between the switching system and the network or central office should be cleared. A tone detector in the switching system continually monitors incoming communications for the disconnect tone. Responsive to receiving the disconnect tone, the tone detector clears the connection.

For economic reasons a two wire circuit typically connects the call devices to the switching system and a two wire trunk connects the switching system to the network or central office. The switching system comprises a four wire circuit that includes a two wire receive path and a two wire transmit path. Hybrid circuits in the switching system interface the four wire circuit with the two wire trunk and the two wire circuit respectively. The hybrid circuits ideally should provide a perfect impedance match between the four wire circuit, the two wire trunk, and the two wire circuit. The hybrid circuits balance the impedance so that the incoming signal from the trunk is passed directly to the receive path in the four wire circuit and the outgoing signal from the call device is passed directly to the transmit path of the four wire circuit and onto the trunk with no portion of the outgoing signal appearing in the receive path. However, variations in the characteristics of hybrid circuits result in an imbalance causing portions of the outgoing signal in transmit path of the four wire circuit to appear in the receive path of the four wire circuit and be returned to the local caller as echo return.

Unfortunately, tone detectors cannot effectively detect tone transmissions when echo return is present. One example of this problem occurs during conference calls between a remote caller connected to the network or central office and two local callers connected to the switching system. When the remote caller goes on-hook, a disconnect tone transmission is transmitted to the switching system from the network or central office. The imperfect impedance at the hybrid often results in a mixed tone transmission and echo return being received in the tone detector. The combination of tone transmission and echo return confuses the tone detector causing a detection failure. The detection failure results in an active call connection even where no caller is present. Over time, the number of active call connections without callers increases until significant network resources are depleted. Network administrates must then determine which active connections actually connect to a caller and manually clear the active connections without callers.

SOLUTION

The present invention advances the art by providing a communication circuitry configured to provide effective tone detection in communication networks. The communication circuitry could be a stand alone device or incorporated into other devices requiring reliable tone detection. The tones could be any tones transmitted over a communication network. Advantageously, the present communication circuitry improves network efficiency and increases network resource availability.

The communication circuitry comprises filtration circuitry, summation circuitry, detection circuitry, and interface circuitry. The filtration circuitry is configured to receive a communication, process the communication to generate an estimate of an echo return present in the communication, and provide the estimate of the echo return to the summation circuitry. Prior to operation, the filtration circuitry is trained to estimate the echo return from a specific device such as the hybrid. Some examples of the communication include a voice communication, data communication, or video communication. The summation circuitry is configured to receive the estimate of the echo return from the filtration circuitry, receive a tone transmission, subtract the estimate of the echo return from the tone transmission to generate a substantially pure tone, and provide the substantially pure tone to the detection circuitry. The detection circuitry is configured to receive the substantially pure tone and process the substantially pure tone to perform a programmed operation. The programmed operation could be any operation the detection circuitry is configured to perform in response to receiving a specific tone. The interface circuitry is configured to receive the communication, receive the tone transmission, provide the communication to the filtration circuitry, and provide the tone transmission to the summation circuitry.

DETAILED DESCRIPTION

Figure 1:
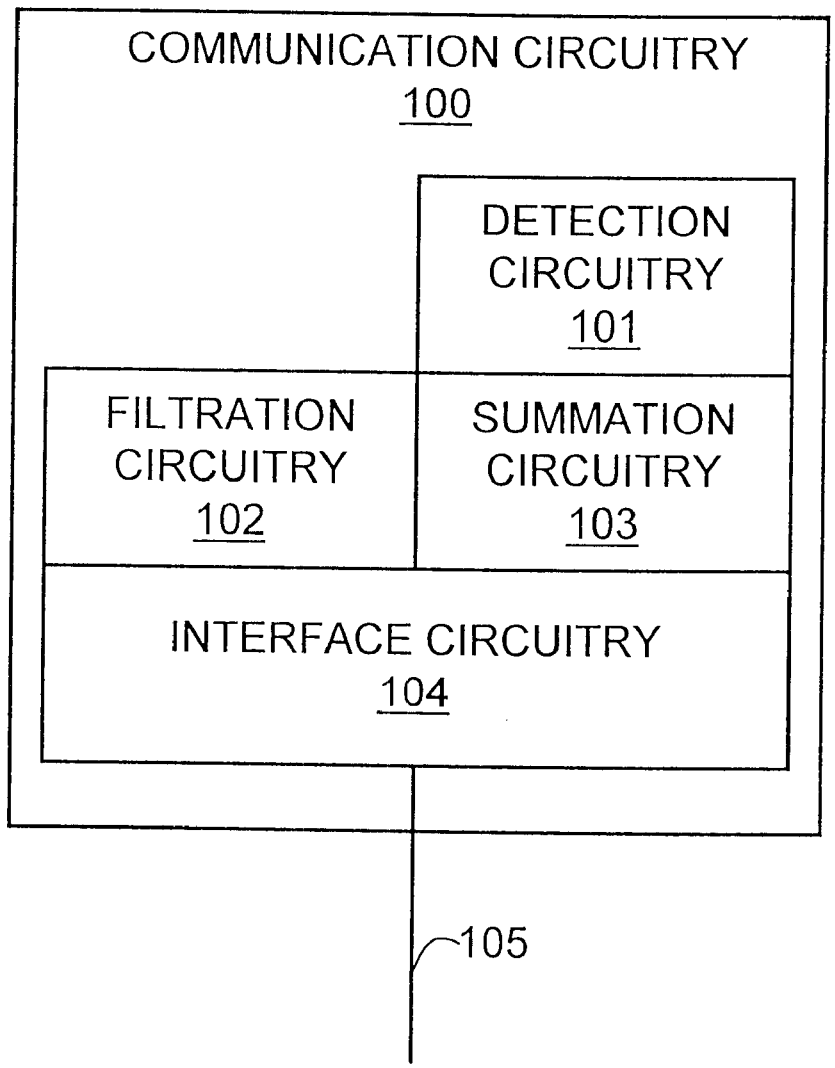
FIG. 1 illustrates an example of a communication circuitry according to the present invention.

FIG. 1 depicts a communication circuitry according to the present invention. The communication circuitry comprises interface circuitry 104, filtration circuitry 102, summation circuitry 103, and detection circuitry 101. The summation circuitry 103 is coupled to the filtration circuitry 102, the interface circuitry 104, and the detection circuitry 101. The filtration circuitry 102 is coupled to the interface circuitry 104 and the summation circuitry 103.

The interface circuitry 104 includes conventional communication path 105. The communication path 105 could be any wireless communication path or wireline communication path. Those skilled in the art will appreciate that interface circuitry 104 could handle numerous such paths although only communication path 105 is shown for clarity. The interface circuitry 104 could be any circuitry configured to receive the communication, receive the tone transmission, provide the communication to the filtration circuitry 102, and provide the tone transmission to the summation circuitry 103. The interface circuitry 104 could be a voice interface that acts as a plain old telephone service (POTS) interface, supervises signals, channels voice lines, or resolves contention between voice lines. The interface circuitry 104 could also be a data or video interface that manages data and video streams or concentrates video and data communication paths.

The filtration circuitry 102 could be any circuitry configured to receive the communication, process the communication to estimate an echo return present in the communication, and provide the estimate of the echo return to the summation circuitry 103. One example of filtration circuitry 102 includes without limitation, a finite impulse response filter (FIR). The communication could be any communication with some examples including but not limited to, a voice communication, a data communication or a video communication. The summation circuitry 103 could be any circuitry configured to receive the estimate of the echo return from the filtration circuitry 102, receive the tone transmission from interface circuitry 104, and subtract the estimate of the echo return from the tone transmission to generate a substantially pure tone. The summation circuitry 103 also provides the substantially pure tone to the detection circuitry 101. The detection circuitry 101 could be any circuitry configured to receive the substantially pure tone and process the substantially pure tone to perform a programmed operation. The programmed operation could be any operation the detection circuitry 101 is configured to perform in response to receiving a specific tone.

Those skilled in the art will appreciate that communication circuitry 100 is circuitry and may be configured to stand alone or be incorporated into various devices, including but not limited to, a switching system, a user device, a local telephone exchange, and/or various network devices located within a communication network. In addition, various configurations can be arranged that perform the operations of the present invention. For example, the interface circuitry 104, filtration circuitry 102, summation circuitry 103, and detection circuitry 101 could be in the same processing circuitry or included on the same chip. The interface circuitry 104 could be incorporated into the filtration circuitry 102 and/or the summation circuitry 103. The above-described elements could also be comprised of instructions that are stored on storage media. These instructions could be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry such as that found in digital signal processor. Those skilled in the art are familiar with instructions, processors, and storage media.

Figure 2:
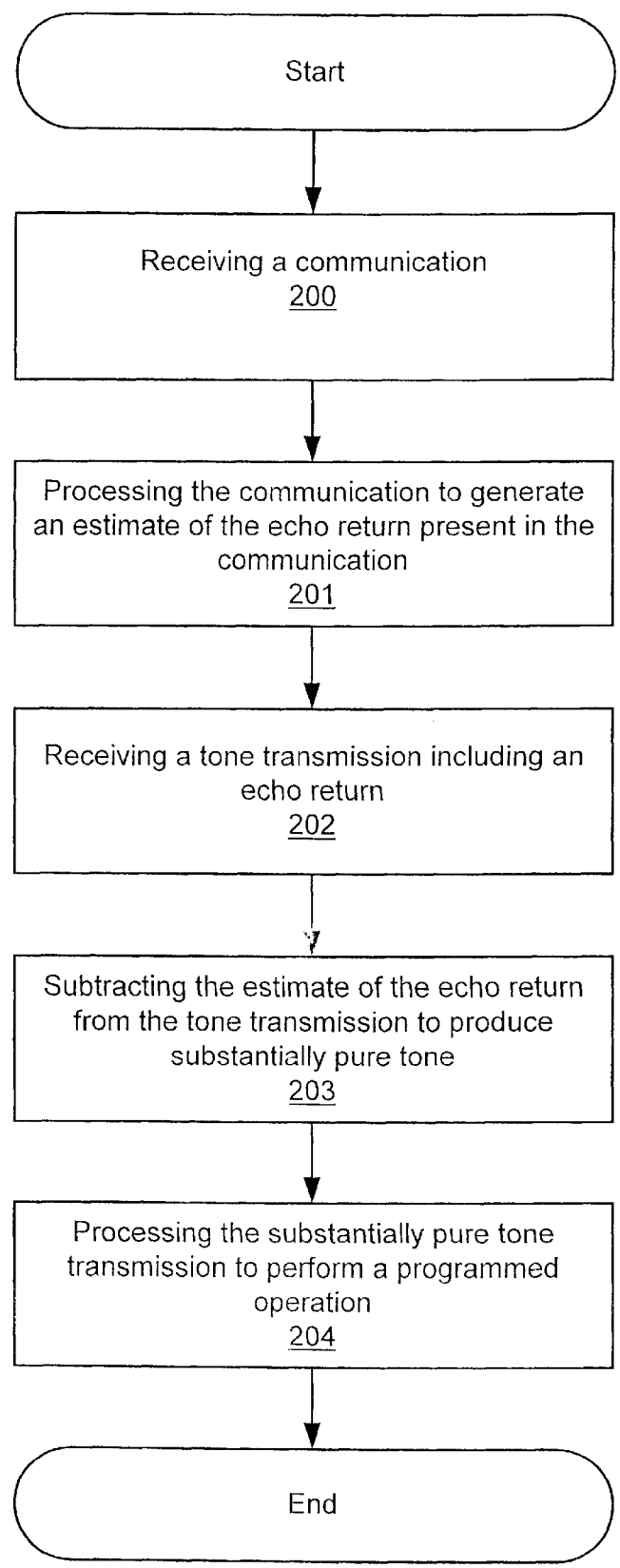
FIG. 2 is a flow chart illustrating an example of the operational steps of a communication circuitry according to the present invention.

Communication Circuitry Operation FIG. 2

FIG. 2 depicts a flow chart illustrating an example of the operation of a communication circuitry according to the present invention. On FIG. 2 a communication is received in interface 104 over communication path 105, at step 200. Interface 104 provides the communication to filtration circuitry 102. The filtration circuitry 102 processes the communication to generate an estimate of the echo return present in the communication at step 201. The filtration circuitry 102 provides the estimate of the echo return to summation circuitry 103. Interface circuitry 104 receives a tone transmission including an echo return over communication path 105 at step 202. Interface circuitry 104 provides the tone transmission to summation circuitry 103.

Summation circuitry 103 subtracts the estimate of the echo return from the tone transmission at step 203 to generate a substantially pure tone. Summation circuitry 103 provides the substantially pure tone to the detection circuitry 101. The detection circuitry 101 processes the substantially pure tone at step 204 to perform a programmed operation. The programmed operation could be any operation detection circuitry 101 is configured to perform in response to receiving the specific tone. Some examples of the programmed operation include without limitation, clearing a call connection, forwarding a call, initiating a call connection.

Those skilled in the art will appreciate that filtration circuitry 102 could continually estimate the echo return present in incoming communications and provide the estimates of the echo return to summation circuitry 103. A tone transmission however may not be continually received by summation circuitry 103.

Figure 3:
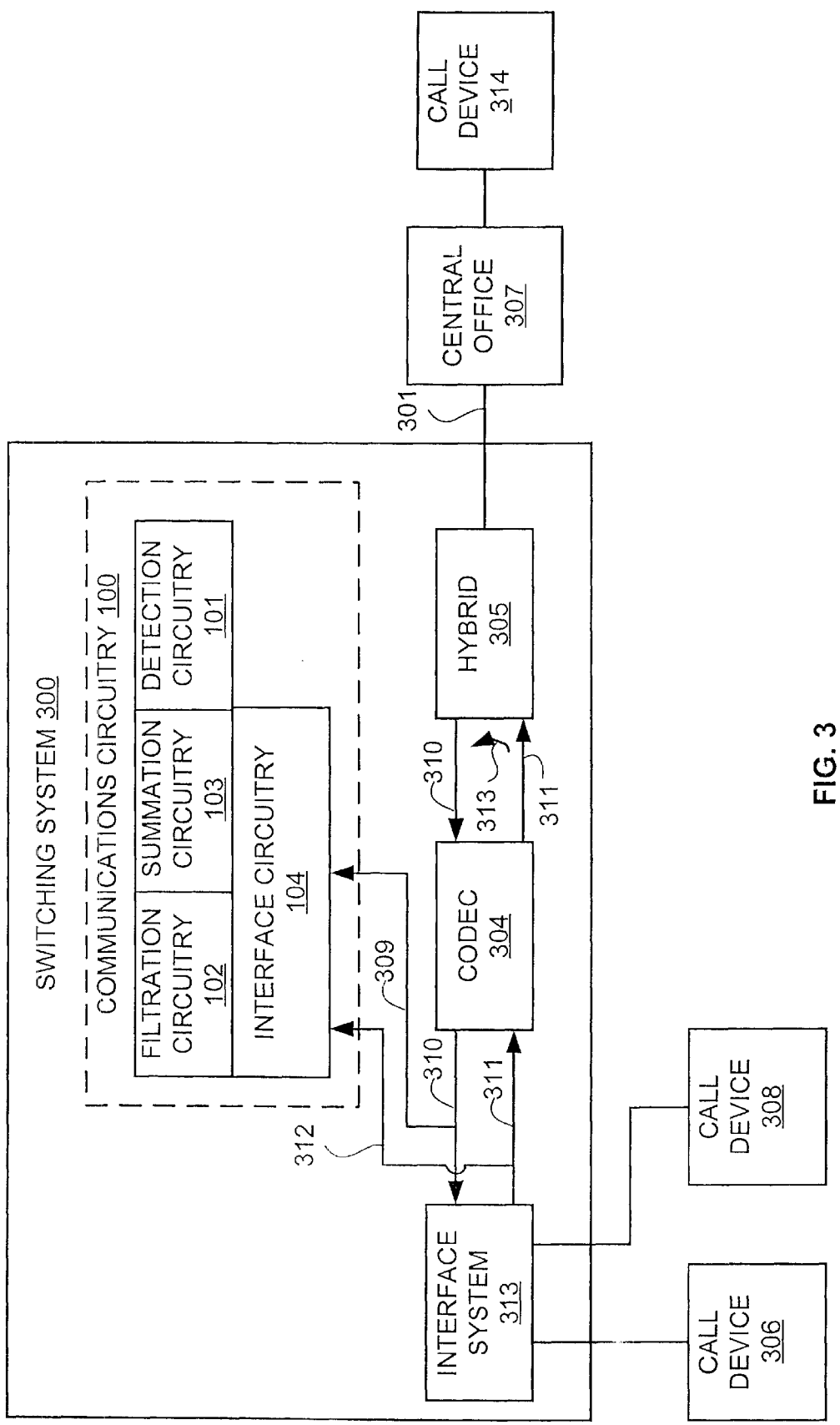
FIG. 3 illustrates another example of a communication circuitry according to the present invention.

Switching System FIG. 3

FIG. 3 illustrates one example of a communication circuitry according to the present invention incorporated into a switching system 300. Those skilled in the art will appreciate numerous variations that do not depart from the present invention. Those skilled in the art will also appreciate that various features described below could be combined with the above described embodiment to form multiple variations of the invention.

FIG. 3 depicts a switching system 300, central office 307, and call devices 306, 308 and 314. Switching system 300 comprises communication circuitry 100, interface system 313, CODer-DECoder (CODEC) 304, and hybrid 305. One example of switching system 300 is a PBX. Those skilled in the art will understand that switching system 300 and interface system 313 would include various other conventional components not shown on FIG. 3 for clarity.

Communication circuitry 100 comprises filtration circuitry 102, summation circuitry 103, detection circuitry 101, and interface circuitry 104. Interface circuitry 104 is coupled to summation circuitry 103 and filtration circuitry 102. Summation circuitry 103 is coupled to filtration circuitry 102 and detection circuitry 101.

Interface system 313 is connected to call devices 306 and 308 by conventional communication paths. Central office 307 is connected to call device 314 by a conventional communication path. Codec 304 is connected to interface system 313 and hybrid 305 by incoming communication path 310 and outgoing communication path 311. Incoming communication path 310 could be a conventional communication path for carrying incoming communications from the hybrid 305 to the interface system 313. Outgoing communication path 311 could be a conventional communication path for carrying outgoing communications from the interface system 313 to the hybrid 305. Interface circuitry 104 is connected to communication path 310 by communication path 309. Communication paths 309 and 310 provide equivalent incoming communications from CODEC 304 to interface circuitry 104 and to interface system 313 respectively. Interface circuitry 104 is also connected to communication path 311 by communication path 312. Communication paths 311 and 312 provide equivalent outgoing communications from interface system 313 to codec 304 and to interface circuitry 104. Central office 307 is connected to hybrid 305 by communication path 301. Communication path 301 could be a conventional communication path for carrying incoming and outgoing communications between switching system 300 and central office 307.

Call devices 306, 308, and 314 could be any conventional call devices. Some examples of call devices 306, 308, and 314 include without limitation, telephones, fax machines, modems, and computers systems. Central office 307 is a conventional telephone company facility where subscribers lines are joined to switching equipment for connecting other subscribers to each other, locally and long distance. CODEC 304 is a conventional device for converting voice signals from analog form to digital form acceptable to digital transmission systems. CODEC 304 then converts those digital signals back to analog format. Hybrid 305 is a conventional device for converting incoming communications from communication path 301 onto incoming communication path 310 and converting outgoing communications from communication path 311 onto communication path 301.

Figure 4:
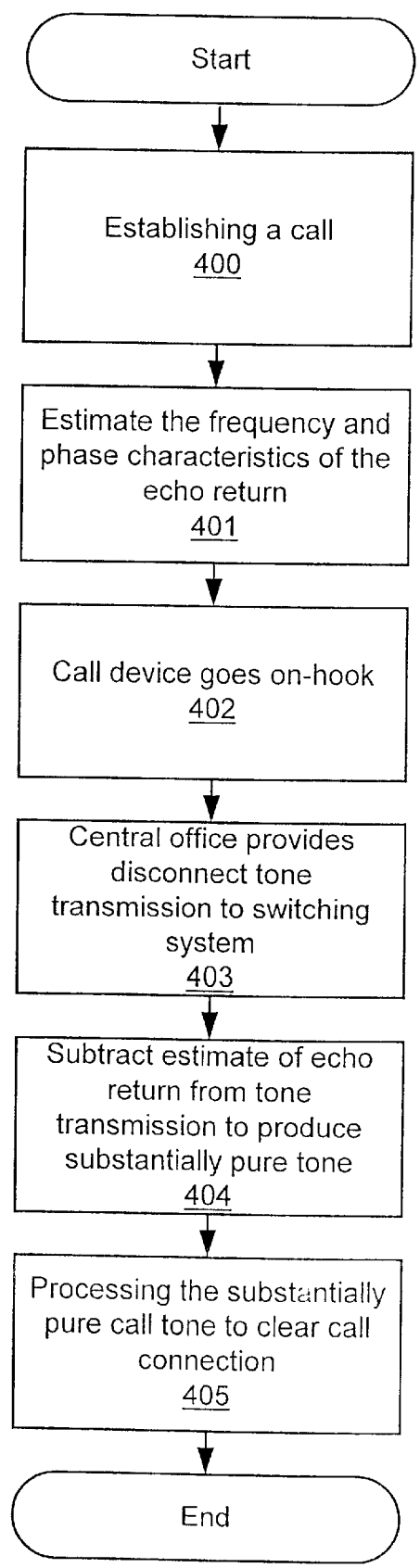
FIG. 4 is a flow chart illustrating an example of the operational steps of the example in FIG. 3.

Switching System Operation FIGS. 3–4

FIG. 4 depicts a flow chart illustrating an example of the operation of communication circuitry 100. On FIG. 4 a call is established between call devices, 306, 308, and 314 at step 400. During the call, outgoing communications are carried from call devices 306 and 308 over communication path 311 to Hybrid 305 via interface system 313 and codec 304. The outgoing communications are also provided to interface circuitry 104 over communications path 312. Incoming communications are carried over communication path 310 from hybrid 305 to call devices 306 and 308 via codec 304 and interface system 313. The incoming communications are also provided to interface circuitry 104 over communications path 309. Echo return 313 represents that portion of the outgoing communications from communication path 311 appearing in the incoming communication path 310 as echo.

At step 401, the interface circuitry 104 receives the outgoing communications from the communication path 312 and provides the outgoing communications to the filtration circuitry 102. The filtration circuitry 102 processes the communications to generate an estimate of the frequency and phase characteristics of the echo return 313. Filtration circuitry 102 provides the estimate of the echo return 313 to summation circuitry 103.

At some point after the call is established, call device 314 goes on-hook at step 402. Responsive to detecting the on-hook event from call device 314, central office 307 provides a disconnect tone transmission to switching system 300 at step 403. The disconnect tone transmission is received over communication path 309 by interface circuitry 104 and provided to summation circuitry 103. The disconnect tone transmission includes the echo return 313 from communications between the remaining call devices 306 and 308. Summation circuitry 103 processes the disconnect tone transmission to subtract the estimate of the echo return 313 from the tone transmission to produce a substantially pure tone at step 404. Summation circuitry 103 provides the substantially pure tone to detection circuitry 101. Detection circuitry 101 processes the substantially pure tone to clear the call connection for call device 314 to central office 307 at step 405.

Figure 5:
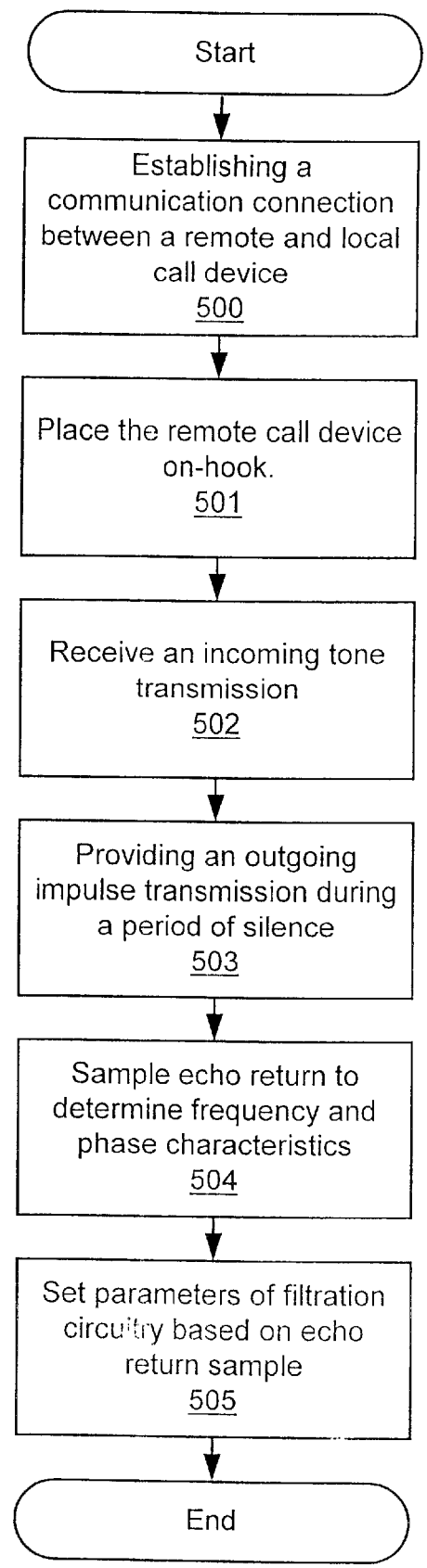
FIG. 5 is a flow chart illustrating an example of the operational steps for training a filtration circuitry according to the present invention.

Filtration Circuitry Training—FIG. 5

FIG. 5 illustrates the operational steps for training filtration circuitry 102 to estimate the echo return 313. Those skilled in the art will appreciate numerous variations that do not depart from the present invention. Those skilled in the art will also appreciate how the principles illustrated in this example can be used in other examples of the invention.

On FIG. 5 a communication connection is established between a remote call device 314 and local call device e.g. 306 at step 500. The remote call device 314 is placed on-hook at step 501. An incoming tone transmission from central office 307 is received in the switching system 300 at step 502. Those skilled in the art will appreciate that the tone transmission comprises periods of tone separated by periods of silence. During a period of silence, a brief impulse transmission is provided by CODEC 304 over the outgoing communication path 311 at step 503. A portion of the impulse transmission appears in the incoming tone transmission during the period of silence as echo return. The echo return is equivalent to the echo return 313 of hybrid 305. The echo return 313 is sampled and digitized at step 504 to determine the frequency and phase characteristics of the echo return 313 at step 504. Filtration circuitry 102 is programmed at step 505 using the samples to provide the parameters of filtration circuitry 102 utilized to estimate the echo return 313 during subsequent operation. Those skilled in the art will appreciate that the above training can also be used to program detection circuitry 101 to detect specific tones.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A tone detector circuit comprising:
    training means for training the tone detector circuit to estimate an echo return comprising a portion of an outgoing signal transmitted on a communication connection that is returned on said communication connection, comprising:
    means for establishing said communication connection between two call devices,
    means for placing one of the call devices on-hook, means for receiving a tone transmission on said communication connection, means for providing, substantially concurrently with receiving the tone transmission, an outgoing impulse transmission on said communication connection during a period of silencer;

means for sampling the echo return of the impulse transmission received from said communication connection to generate the estimate of the echo return, means for setting filtration circuit parameters based on the estimate of the echo return;

filtration means configured to process a communication to generate the estimate of the echo return;

summation means configured to process the tone transmission to subtract the estimate of the echo return from the tone transmission to generate a substantially pure tone; and detection means configured to process the substantially pure tone to perform a programmed operation.

2. The tone detector circuit of claim 1 further comprising:

interface means configured to receive the communication, receive the tone transmission and provide the communication to the filtration means and provide the tone transmission to the summation means.

3. The tone detector circuit of claim 1 wherein the filtration means is a finite impulse response filter.

4. The tone detector circuit of claim 1 wherein the tone transmission is a disconnect tone.

5. The tone detector circuit of claim 1 wherein the tone detector circuit is incorporated into a switching system.

6. The tone detector circuit of claim 1 wherein the programmed operation comprises:

clearing a communication path.

7. A method of operating a tone detector circuit, the method comprising:

training the communication circuit to estimate an echo return comprising a portion of an outgoing signal transmitted on a communication connection that is returned on said communication connection, comprising:

establishing said communication connection between two call devices, placing one of the call devices on-hook, receiving a tone transmission on said communication connection, substantially concurrently with the step of receiving the tone transmission, providing an outgoing impulse transmission on said communication connection during a period of silence, sampling the echo return of the impulse transmission received from said communication connection to generate the estimate of the echo return, setting filtration circuit parameters based on the estimate of the echo return;

receiving a communication;

generating, in response to receiving the communication, the estimate of the echo return in the communication;

receiving the tone transmission including the echo return;

subtracting the estimate of the echo return from the tone transmission to produce a substantially pure tone; and processing the substantially pure tone to perform a programmed operation.

8. The method of claim 7 wherein the tone transmission is a disconnect tone.

9. The method of claim 7 wherein the programmed operation is clearing a communication path.

10. The method of claim 7 wherein the tone detector circuit is incorporated into a switching system.

* * * * *